United States Patent [19]

Kirkman et al.

[11] Patent Number: 5,017,758
[45] Date of Patent: May 21, 1991

[54] NON-THERMOSTATICALLY CONTROLLED HIGH POWER OIL PAN-HEATER

[75] Inventors: Todd A. Kirkman, Hillsdale, Wis.; William D. Heath, Thorp, Wash.

[73] Assignee: Toddco Research and Development Company, Inc., Yakima, Wash.

[21] Appl. No.: 360,189

[22] Filed: Jun. 1, 1989

[51] Int. Cl.⁵ .................. H05B 3/00; F16N 39/04; F01M 5/02
[52] U.S. Cl. .................. 219/205; 123/142.5 E; 184/104.1; 184/104.2; 219/535; 219/536; 219/549; 392/444
[58] Field of Search .......... 219/202, 205, 208, 528, 219/549, 535, 536; 184/104.1, 104.2; 123/142.5 R, 142.5 E; 392/444

[56] References Cited

U.S. PATENT DOCUMENTS

| | | | |
|---|---|---|---|
| 1,781,412 | 11/1930 | Slichter | 219/205 |
| 2,475,989 | 7/1949 | Ronning | 219/205 X |
| 2,698,374 | 12/1954 | Carpenter | 219/205 |
| 2,721,253 | 10/1955 | Langlois | 219/205 |
| 2,838,648 | 6/1958 | Ladue | 219/205 |
| 3,213,263 | 10/1965 | Steenbergen | 219/205 |
| 3,243,573 | 3/1966 | Weisse et al. | 219/536 X |
| 4,395,618 | 7/1983 | Cunningham | 219/298 |
| 4,776,529 | 10/1988 | Tanis | 219/202 X |

FOREIGN PATENT DOCUMENTS

| | | | |
|---|---|---|---|
| 705522 | 3/1965 | Canada | 219/205 |
| 782671 | 4/1968 | Canada | 219/205 |
| 609147 | 9/1948 | United Kingdom | 219/205 |

Primary Examiner—Anthony Bartis
Attorney, Agent, or Firm—Jacobson & Johnson

[57] ABSTRACT

A selected quantity of lubricating oil in the reservoir of an oil system exposed to low ambient temperatures is maintained at a temperature above 170 degrees F. but below the oil breakdown temperature of 300 degrees F. by a non-thermostatically controlled flexible planar electric heating element adhesively secured to the exterior surface of the reservoir. The heating element has a uniform power density of at least about 15 watts per square inch and a constant power output of about 20 to 40 watts per quart of oil in the reservoir. The thermal balance formed between the continuous heat generation by the heating element and the continual heat dissipation from the oil system maintains the oil temperature between the desired limits.

11 Claims, 3 Drawing Sheets

NON-THERMOSTATICALLY CONTROLLED HIGH POWER OIL PAN-HEATER

FIELD OF THE INVENTION

This invention relates generally to high power oil heaters for land based equipment and, more specifically, to a high power oil conduction heater that does not heat the oil above the oil breakdown temperature and utilizes the thermal mass of the oil and the engine oil system to maintain the temperature of the oil within a predetermined temperature range below the oil breakdown temperature even tho the outside air temperature may vary substantially.

BACKGROUND OF THE INVENTION

The concept of engine oil heaters is old in the art. In general a heating element is either placed outside of the engine oil pan or into the oil located in the oil reservoir in the engine pan. Because of the problem of thermal breakdown of engine oil the engine oil heaters differ from engine block heaters which heat the engine coolant. Since the coolant does not breakdown under normal heating temperatures, high temperature heating elements can be placed directly in the coolant while heating of engine oil with high temperature heating elements results in breakdown or carbonization of the engine oil.

The prior art oil reservoir heaters that are placed directly in the oil reservoir have two drawbacks. The first is that engine oil heaters, particularly those that operate off the vehicles battery, are of insufficient power to heat the oil to proper temperature to minimize engine wear. In general battery powered heaters have very limited heating life since the battery becomes more inefficient as the temperature of the outside air decreases. On the other hand those prior art heaters that operate off external source may produce such high localized temperatures that the oil around the heating element begins to carbonize or breakdown. In general the temperature at which the oil breaks down varies with the type of oil but in most cases oil breaks down if the temperature is in excess of 300 degrees F. Consequently, such high energy direct contact oil heaters as dipstick heaters are shunned by those who are familiar with the problems that can occur in an engine when the oil breaks down and loses its lubricating qualities. In general if the prior art engine oil heaters don't generate enough heat to produce oil breakdown the heaters usually don't have sufficient heat generation capacity to heat the oil to the proper temperature range to minimize wear on the engine since the engine oil system dissipates heat to the surrounding atmosphere through the engine and the engine oil system.

Another concept of engine oil heaters places an external heater outside the oil pan and then uses a switch or a thermostat to monitor the temperature of the oil or the temperature of the heater. It was believed that such a system would be ideal since the switch or thermostat shuts off the heater when the oil temperature becomes to high thereby preventing the oil from breakdown. Unfortunately, when such thermostatically controlled prior art engine heaters are secured to the exterior of the engine oil pan of heavier surface equipment they have been found to produce insufficient heat or erratic and inconsistent temperature control thereby rendering them ineffective in maintaining the oil temperature of an engine within a prescribed temperature range. It has been found that one of the difficulties, particularly with thermostatically controlled heaters that are secured to the exterior of the engine oil pan of heavier surface equipment, is that either the temperature of the engine oil can not be maintained in a specified range or the heater gradually produces less heat output making it ineffective for maintaining the oil within prescribed limits.

Heating the engine oil to a minimum temperature of about 170 degrees F remains a very desirable goal since hot oil not only makes the engine easier to start in cold climates but also reduces the frictional wear on engine parts thereby prolonging the life of the engine. In most engine applications one wants to maintain the within a temperature range of 170 degrees F to 200 Degrees F to minimize engine wear. It should be understood that if one is increasing the oil temperature only for the purpose of providing starting assistance a lesser oil temperatures could be used since in even the coldest conditions instances heating engine oil up to 60 F is sufficient to start the engine if the battery has not lost its efficiency. However, in extremely cold climates such as encountered in northern climates where the temperature may reach $-40$ to $-50$ degrees F. the heating of the oil to a higher temperature also compensates for the loss of efficiency in the battery thus enabling the user to start an engine under the most extreme environmental conditions.

The present invention provides an improved engine oil heater that in the preferred embodiment heats and maintains the oil to a temperature of 180 degrees F. to 200 degrees F. while eliminating the problem of oil breakdown and inconsistent temperature control of the engine oil through a thermal balance heater that has been found to be relatively insensitive to the temperature of the surrounding atmosphere.

DESCRIPTION OF THE PRIOR ART

The 1927 Loper U.S. Pat. No. 1,627,564 shows a low power electric heater for heating the oil in the crankcase of an automobile engine. Loper uses a 6 or 12 volt battery to power his heater. Loper inserts his heater through a hole in the side of the crankcase which he preferably has at below the oil level.

The 1930 Gelino U.S. Pat. No. 1,770,642 shows a crankcase oil heater that uses a thirty-two candle power light bulb that is powered by the automobile battery to heat his crankcase oil.

The 1930 Jackson U.S. Pat. No. 1,764,021 shows an early engine preheater that clamps a heater below the oil pan. In the Jackson heater a heating coil located in grooves in his heater heats the engine oil through radiation and convection. Jackson provide a three position switch to permit the user to provide a fast heating of the oil, a slow heating of the oil or a shut off condition. The Jackson heater is not conformable to the shape of the exterior oil pan.

The 1931 Schwalbach U.S. Pat. No. 1,817,520 shows another heater that has a heating element located through the side of the crankcase to heat the oil in the crankcase.

The 1932 Pingrey U.S. Pat. No. 1,866,986 shows an oil heater that is submerged in the crankcase. oil The 1932 Lee U.S. Pat. No. 1,881,772 shows an engine oil heater that can be heated by either a battery or an 110 volt source.

The 1951 Smith U.S. Pat. No. 2,551,770 shows a dipstick type heater that applies from forty to sixty watts to heat the engine oil.

The 1954 Carpenter U.S. Pat. No. 2,698,374 shows an engine oil pan heater that fastens a heating device to the side of an engine oil pan. Carpenter proposes that his engine heater utilize a thermostat located outside of the oil pan to monitor the temperature of the oil and to automatically shut off the heater when the oil reaches a prescribed temperature. The Carpenteur heater comprises a heating element embedded in fire cement brick. The engine heater is held in surface contact with the oil pan through a resilient arm that connects to the oil pan fasteners.

The 1976 Hosokawa U.S. Pat. No. 3,970,816 shows another oil heater that uses the battery power to raise the temperature of the oil. He reports that the oil temperature was raised from −20 degrees C. to 10 degrees C. which was sufficient to enable the engine to be started. Hosokowa claims that his heating device emits infrared wavelengths ranging from 2.5 microns to at least 15 microns. A timer switch is used to set the time the heater is on.

One other type of prior art engine heater is the magnetic engine oil heater which comprises a ceramic magnet that is fastened to a metal oil pan. The ceramic conducts electricity to generate heat to the oil pan. Magnetic heaters suffer from the inability to generate sufficient heat to raise the oil to the proper temperature.

None of these prior art devices recognize the need to heat and maintain the oil in a proper temperature without causing breakdown of the oil.

Still another type of prior art heaters used in light weight aircraft engines to heat the oil to a temperature of 165 degrees F. typically utilize a lower power heating element that is secured directly to the bottom of the oil pan through an adhesive. A thermostat located outside of the oil pan and spaced from the heating element indirectly monitors the oil temperature to cycle the heater on and off and maintain the oil in the reservoir at a temperature of about 165 degrees F. While such thermostatically controlled heaters work well on lightweight aircraft engines that have aluminum oil pans the use of thermostatically controlled heaters on heavier surface equipments such as water land vehicle engines or land systems that have irregular shaped oil pans of various materials has been found to produce ineffective and inconsistent heating of the oil.

BRIEF SUMMARY OF THE INVENTION

Briefly, the present invention comprises a thermal balance engine oil heater where the heating surfaces in contact with oil are at temperature less than the oil breakdown temperature, yet the heater has sufficient heat output to heat and maintain the temperature of the oil within a predetermined temperature range of about 170 to 200 degree F. through utilizing the thermal mass of the engine oil system and a high power heating element having a minimum power density of about 15 watts per square inch and a power output ranging from about 20 to 40 watts per quart of oil that conducts the heat through a heat dissipation member that is adhesively fastened directly to the underside of the oil pan so that the thermal mass of the engine oil system and the heating element power output remain substantially in thermal balance to maintain the temperature of the oil below the oil breakdown temperature and above the required minimum oil temperature even through the thermal mass dissipates heat to the outside air whose temperature may vary substantially over a period of time.

DESCRIPTION OF THE PREFERRED EMBODIMENT

Figure 1:
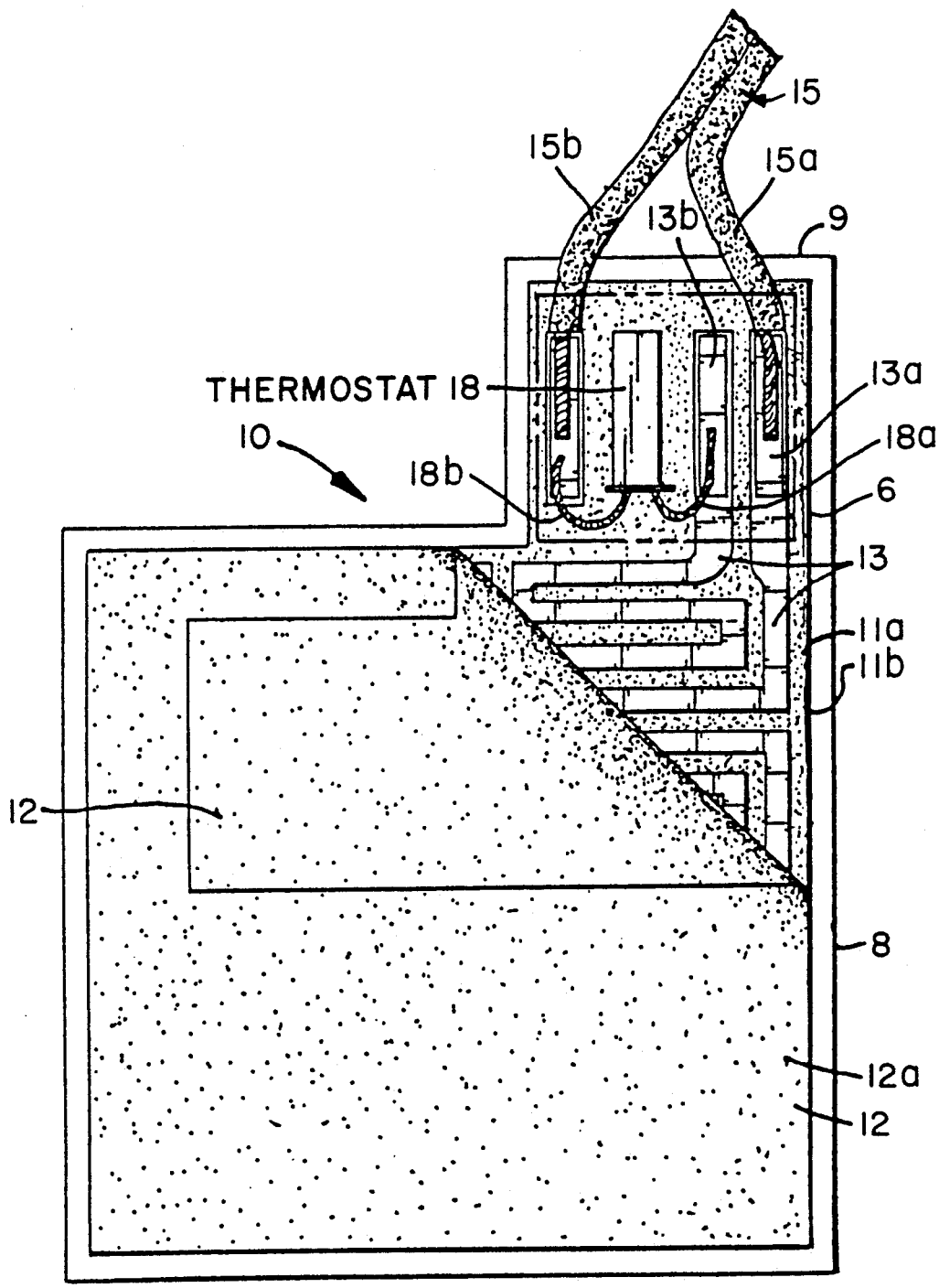
FIG. 1 shows a prior art airplane engine heater utilizing a thermostat to measure the temperature of the oil and cycle the heating element on and off.

Referring to FIG. 1 reference numeral 10 identifies a prior art airplane engine heater for heating engine fluid that comprises a first layer 11 having a front surface 11a and a back surface 11b and a second layer 12 having a front surface 12a and a back surface 12b. The layers 11 and 12 are constructed from a high temperature resistant fiberglass reinforced silicone which can conform to the shape of an oil reservoir. Sandwiched between the layers 11 and 12 is a heating element 13, such as inconel foil that has been photochemically etched. Heating element 13 has a first end 13a that connects to lead 15a of power cord 15 while the other end 13b connects to a thermostat lead 18a of thermostat 18. Thermostat 18 opposite lead 18b connects to lead 15b of power cord 15. The entire airplane engine heater is secured to the oil pan with an adhesive such a R T V silicone, or alternatively, a pressure sensitive adhesive. In operation of the prior art airplane engine oil heater 10 the thermostat operates as an electrical switch to cycle the current on and off to the heating element to prevent the engine oil temperature from exceeding the oil breakdown temperature.

Figure 2:
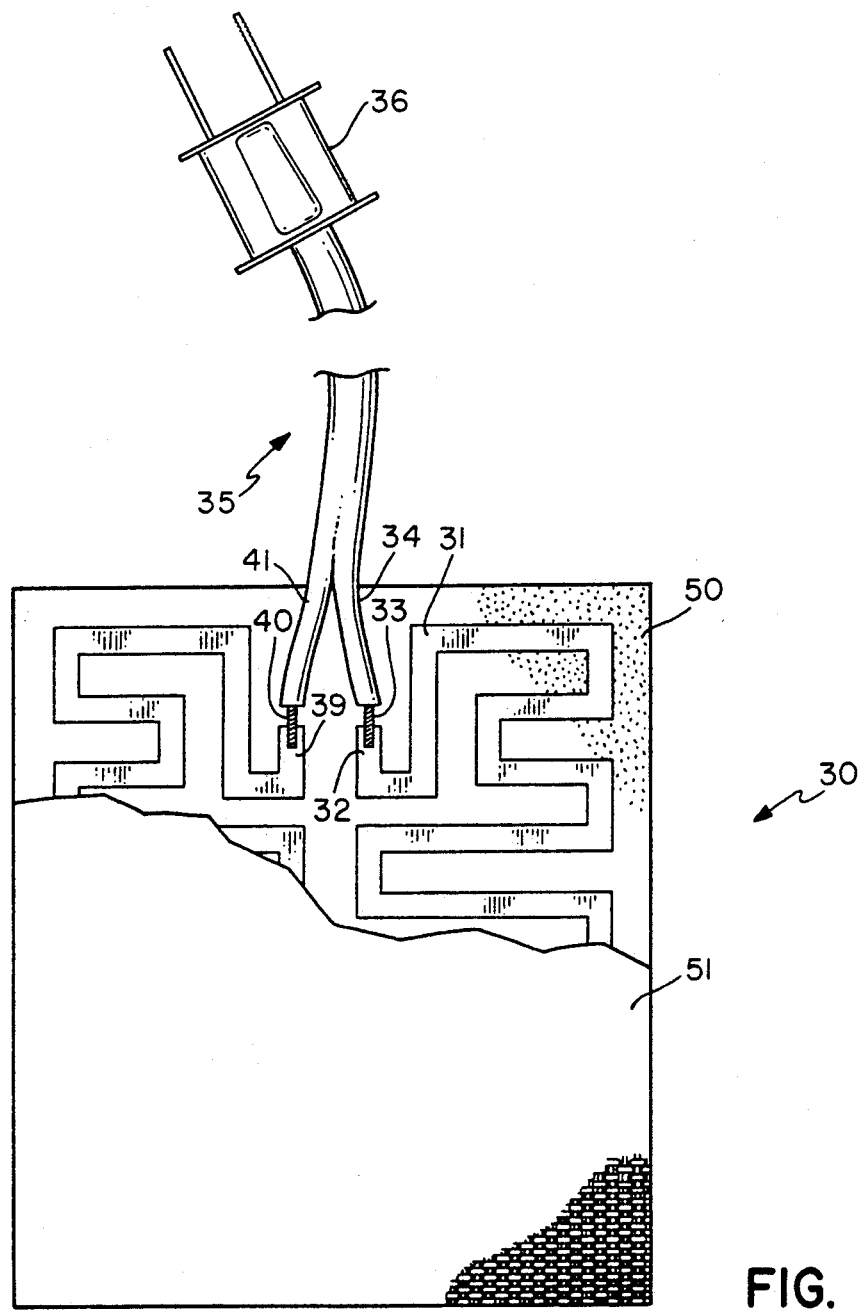
FIG. 2 shows a partial cut away view of our present thermal balance heater.

FIG. 2 shows the present invention comprising our thermal balance engine oil heater that utilizes the thermal mass of the engine oil system and a high power density conduction heating element to maintain the temperature of the engine oil within a desired temperature range. In order to provide a thermal balance heater for use in heating and maintaining the engine oil at the proper temperatures requires one to direct enough heat into the engine oil without overheating the oil and thus breaking down the oil. One of the limitation encountered in land vehicles is that the engine oil pans generally have limited useable space available for mounting an external heater. In some cases the external surface may have an irregular shape unsuitable for mounting a heater thereto. In most cases there are less than 90 square inches of available space. In order to supply the necessary heat to heat the engine oil to the proper temperature requires a high power density heater. We have discovered that if a thermal balance heater is adhesively bonded to the outside of the oil pan to provide conduction heat to the oil through the oil pan that in most land vehicles a substantially uniform power density of about 15 watts per square inch quickly and effectively heats the oil without producing oil breakdown. A power density of 15 watts per square inch requires the heater to be bonded securely to the oil pan so heat can be conducted from the heater to the oil without destroying the heater. That is, if the heater of the present invention is not connected to any heat conducting surface, a power density of about 5 watt per square inch density is all that the heater can withstand without reaching such high temperatures that it destroys itself. Typically, such prior art heaters with such high power densities have used thermostats to ensure that the heater does not overheat.

When utilizing high power density heaters it is important to avoid oil breakdown. It is also important to our invention to supply sufficient power or heat to the engine oil system to maintain the oil at the proper temperature. In typical land vehicle applications an oil temperature range of about 170 degrees F. to 200 degrees F. is preferred and in some cases 180 degrees F. to 200 degrees F. We have found that if we attach a silicone covered conduction heater that has a total power output of about 30 watts per quart of oil to the exterior of oil pan we can maintain the oil temperature within a temperature range of approximately 180 degrees F. to 200 degrees F. even tho the outside air temperature may range from −30 degrees F. to 60 degrees F. (F represents Fahrenheit). In certain cases the outside air temperature may have more or less of an effect on the engine oil temperature. However, we have found that even tho there are wide variations in the outside air temperatures our thermal balance heater that continually conducts heat to the engine oil through the engine oil pan housing maintains the engine oil temperature relatively independent of the outside air temperature. For example, we have found that a change in the air temperature of ±30 degrees may produce only a variation of ±7 degrees in the oil temperature.

Obviously, different engine oil systems will have different thermal masses and respond differently but surprisingly even though engines may be larger or smaller or have different components in the oil system one can maintain the oil within a proper temperature range below the oil breakdown temperature without the need of a thermostat or switch to cycle the power on and off.

In order to appreciate the present invention reference should be made to FIG. 2 which shows the present invention partially in section. Reference numeral 30 generally identifies our heater having a first silicone resin layer 50 with a heating element 31 located thereon. Located on top of heating element 31 is an abrasion covering 51 of fiberglass strands covered with silicone. In order to provide the necessary abrasion resistance for use on land vehicles we use an abrasion shield that a thickness h of about 0.050 inches.

While the use of different materials other than a flexible silicone and a flexible heating element could be used in our invention the irregular shapes and contours of most oil pans require that the heater be flexible so one can conform the heater to the shape of the engine oil pan. Once conformed to the shape of the oil pan. In addition the material should have insufficient memory so as not to come free of the oil pan during the curing process.

The cutaway view of our thermal balance heater 30 shows that end 32 of heating element 31 connects directly to the wire lead 33 and the other end 39 of heating element 31 connects directly to wire lead 40 of power cord 35. Power cord 35 has a male plug 36 for insertion directly into a conventional 110 volt household source of electricity. Flexible insulating material 34 covers wire 33 and an identical flexible insulating layer 41 covers lead 40.

Figure 3:
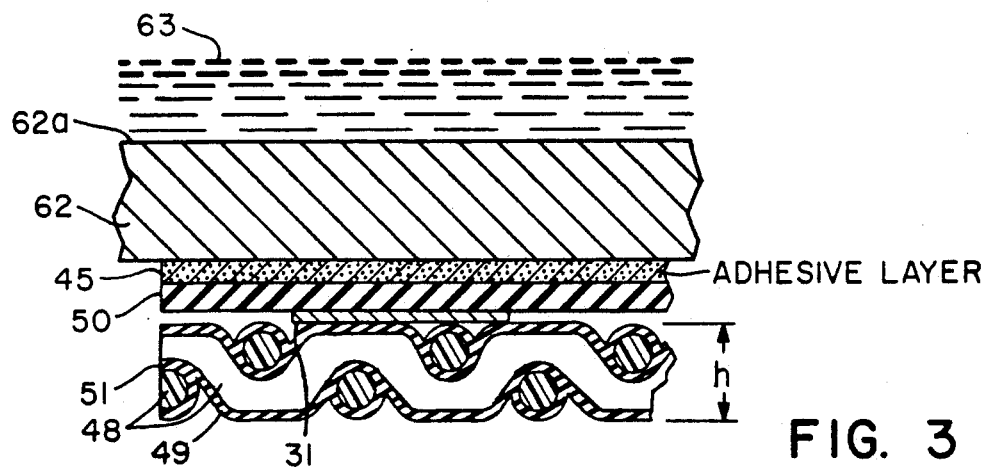
FIG. 3 shows a partial sectional view of our thermal balance heater located against the exterior of an oil pan.

FIG. 3 shows a partial cutaway of the heater as it would appear on an oil pan. Note, the bottom layer of silicone 50 is adhesively bonded to oil pan 62 through a layer of adhesive 45 such as PERMATEX ULTRA BLUE silicone gasket manufactured and sold by the Loctite Corporation. In order to provide good heat transfer between our thermal balance heater and the engine oil pan we prefer to have the adhesive layer about 0.005 inches thick.

FIG. 3 shows a partial cross sectional view of our high power thermal balance heater 30 located on an oil pan 62 of an internal combustion engine of a land vehicle wherein the localized temperature of the oil 63 in contact with surface 62a is heated to a temperature less than the oil breakdown temperature. Typically, an internal combustion engine has an oil pan 62 with an above located reservoir for holding oil 63 with the oil pan having an exterior protective surface. Located on the exterior surface of oil pan 62 is a thermal conducting adhesive layer 45 that secures layer 50 of our thermal balance heater to the engine oil pan 62. The oil 63 for lubricating the internal combustion engine is located in the oil reservoir and directly above our thermal heater. The oil 63 and the engine oil system comprise a thermal mass that both absorbs and dissipates heat. In heat conducting contact with the thermal mass formed by the oil and the engine oil system is a first layer of heat conducting material 50 having an oil pan engagement surface for securing the heat conducting layer 50 to the exterior surface of the oil pan 62 there is provided a heat conducting adhesive layer 45 of about 0.005 inches. In order to protect the heating element 31 of our thermal balance heater from abrasion and damage that occurs in land vehicles we apply a second protective layer of material 51 of a thickness of about 0.050 inches which is twice the thickness of conventional heating element coverings. The flexible electrical heating element 31 sandwiched between the first layer of material 50 and the second layer of material provides a relatively uniform heat source for conduction heating of oil pan 62 through first layer 50 and adhesive 45. Reference numeral 48 identifies the fiberglass strands and reference numeral 49 identifies the silicone covering.

In the embodiment shown the heating element 31 has a substantially uniform power density of at least about 15 watts per square inch. Although the heating element is illustrated as being spaced from itself the spacing is such that heat generated by the heating element is substantially uniformly distributed over the first layer of material 50 and adhesive 45 so that the heater cannot elevate the temperature of the oil 63 in contact with the oil pan above the oil carbonization or breakdown temperature.

The heat conducting adhesive 45 that fastens the first layer of material 50 to the exterior of the oil pan 62 has sufficient thermal conductivity so that heating element 31 can dissipate sufficient heat from itself to the oil pan 62 without destroying the heating element or without raising the oil in contact with the oil pan to a localized temperature in excess of the oil breakdown temperature for a particular oil. In our invention the thermal mass of the engine oil system is matched to the thermal balance heater by comparing the quantity of oil the engine oil system holds to a total heater output factor determined by trial and error. Typically, we have found that for most application in land based vehicles a total heater output factor of about 30 watts per quart is necessary to maintain the temperature of the oil within proscribed temperatures of about 170 degrees F. to about 190 degrees F. even tho the outside ambient air temperature may vary as much as 80 degrees F. Although about 30 watts per quart of oil is the preferred total heater output factor we have found that in most surface systems the total heater output factor may range from as low as 20 watts per quart to as high as 40 watts per quart without adversely affecting the performance. This acceptable variation in the range of power heat factor makes our thermal balance heater useful for oil systems where the amount of oil may vary. In our thermal balance heater the heat generated from the heating element remains constant while the heat dissipated by the thermal mass of engine oil system varies in accordance with the air temperature around the engine oil system. Surprisingly, even tho the heat dissipation rate varies, the oil and the engine oil heater remain in relative stable thermal balance thus maintaining the engine oil temperature in a predetermined temperature range without the use of temperature controls. While it is not fully understood why the temperature of the oil is maintained within prescribed temperature limits of 20 degrees Fahrenheit even tho the outside temperature may vary as much as 80 degrees Fahrenheit it is believed that it may be due to the proximity of the oil to the engine heater that results of less of a thermal difference in the oil than in remote portions of the engine oil system which dissipates the heat to the surrounding atmosphere. This explanation is only offered as suggestion as what may be occurring and applicants have not been able to completely determine why such a consistent temperature can be maintained with a heater that generates a constant heat output regardless of the outside temperature.

While we have found that for most applications the oil temperature can be maintained within a prescribed temperature range of about 20 degrees F. during fluctuations of the outside temperature of as much as 80 degrees F., it is apparent that the variation of the attachment or the materials used to supply the heat to the oil can cause a variation in the power density of 15 watts per square inch. For example, if the heat conduction path to the oil from the heating element were less effective than the preferred embodiment using a silicone layer and a thin layer of adhesive than one may need a higher power density to maintain the oil temperature at the prescribed temperature range. However, once the person has knowledge of the present invention and the effectiveness of utilizing a thermal balance heater to control oil temperature the user can readily experiment with other materials to arrive at the same thermal balance system with different materials.

Figure 4:
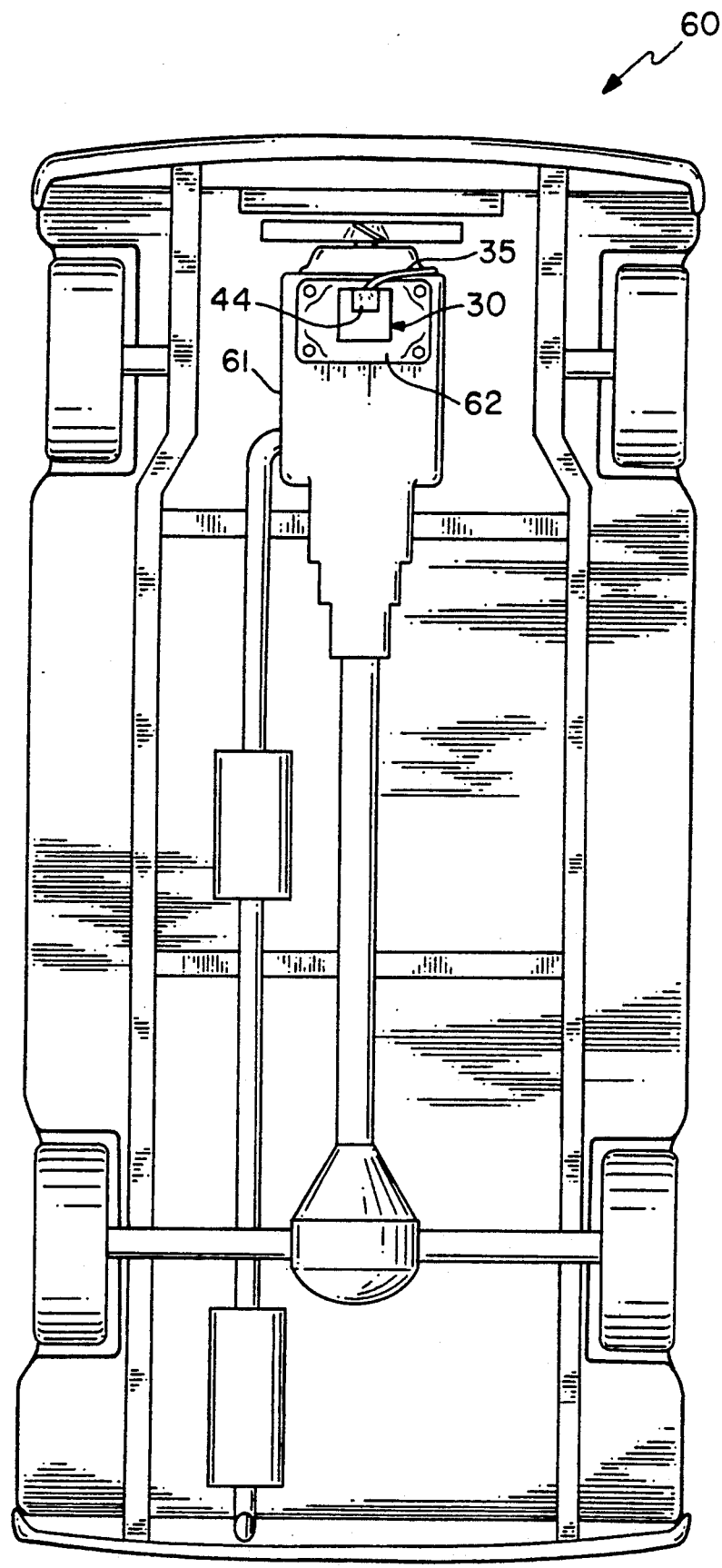
FIG. 4 shows our thermal balance heater mounted to an oil pan on the underside of a vehicle.

Referring to FIG. 4 there is shown a bottom view of a conventional surface vehicle such as a car or truck. Vehicle 60 includes an engine 61 with an engine oil pan 62 having our thermal balance engine heater 30 adhesively bonded to the oil pan 62. A protective silicone pad 44 extends over the junctions of the leads of power cord 35 with the heating element to protect the connections from abrasion.

The following high power thermal balance heaters were uses non-thermostatically control and maintaining the engine oil temperature in a range of 180 degrees F. to 200 degrees F. under substantially all normal ambient air temperatures.

A thermal balance heater model 16 for use on a 5 to 13 quart oil system had a 4" by 4.5" surface area with a power density of 14.9 watts per square inch and a total power consumption of 265 watts.

A thermal balance heater model 40 for use on a 13 to 27 quart oil system had a 5" by 7.5" surface area with a power density of 15.7 watts per square inch and a total power consumption of 550 watts.

A thermal balance heater model 80 for use on a 26 to 48 quart oil system had a 6" by 11.75" surface area with a power density of 14.2 watts per square inch and a total power consumption of 1000 watts. In the above heaters the power consumed ranged from about 40 watts per quart for the lower capacity systems to 20 watts per quart for the higher oil capacity systems.

In each case the silicone adhesive fastened thermal balance heater with a power factor of about 15 watts per square inch was able to maintain the oil temperature within a temperature range of 180 degrees F. to 200 degrees F. over a wide range of atmospheric temperatures without producing breakdown of the oil.

Although the oil temperature could be raised from −40 degrees F. to +60 degrees F. in as little as ninety minutes it generally took about five to six hours to heat the oil the predetermined preferred range of 180 degrees F. to 200 degrees F.

We claim:

1. An internal combustion engine in combination with a high power thermal balance heater for heating the oil located in the oil pan of the internal combustion engine to a temperature that is less than the oil breakdown temperature by heating the oil pan with the thermal balance heater wherein the thermal balance heater is a non-thermostatically controlled high power oil pan heater comprising:

an internal combustion engine exposed to ambient atmosphere, said internal combustion engine having an oil pan with a reservoir for holding oil, said oil pan having an exterior surface;

a selected quantity of oil for lubricating said internal combustion engine located in said reservoir, said oil having a breakdown temperature in excess of 300 degrees F., said oil pan, said oil and said engine comprising a thermal mass, said thermal mass dissipating heat to the ambient atmosphere in accordance with the air temperature outside said internal combustion engine;

a first layer of heat conducting material having an oil pan engagement surface adapted to be secured to said exterior surface of said oil pan of said internal combustion engine, said first layer of material having an exterior surface for engaging an electrical heating element;

a second protective layer of material having an exterior surface, said second protective layer having an interior surface for engaging an electrical heating element;

an electrical heating element sandwiched between said first layer of material and said second layer of material to provide a heat source for heating said exterior surface of said oil pan of said engine through said first layer, said heating element having a substantially uniform power density of at least about 15 watts per square inch, said heating element power being substantially uniformly distributed over said first layer of material so that said heating element cannot elevate the local temperature of the oil in said oil pan above the oil carbonization or oil breakdown temperature, said heating element having a constant power output within the range of about 20 watts per quart of oil to about 40 watts per quart of oil to thereby have sufficient heat output to heat said oil in said oil pan in excess of 170 degrees F. but less than said oil breakdown temperature;

a heat conducting adhesive fastening the pan engagement surface of said first layer of material to said exterior of said oil pan of said engine, said adhesive having sufficient thermal conductivity so that said heating element can dissipate sufficient heat from itself to said oil pan without destroying the heating element, whereby the heat generated from said heating element and the heat absorbed by said thermal mass of said engine and the heat dissipated to the ambient atmosphere are in thermal balance to continually maintain the engine oil temperature in a predetermined temperature range below the engine oil breakdown temperature without the use of temperature controls even though the heat output of said heating element is constant and the heat dissipation of said thermal mass varies with the ambient atmospheric air temperature outside said engine.

2. The thermal balance heater of claim 1 wherein said thermal balance heater has a substantially rectangular shape.

3. A method of maintaining the temperature of oil in an oil reservoir within predetermined temperature limits comprising the steps of:

placing a heat producing element in heat conduction contact with an engine oil system having a supply of oil to be maintained at a predetermined temperature below the oil breakdown temperature; wherein the heat producing element has a heat output of at least 20 watts per quart of oil in the engine oil system and a power density in excess of 15 watts per square inch;

continuously supplying a constant power to the heat producing element in heat conduction contact with a supply of oil in an oil reservoir without any thermostatic control of the power to raise the temperature of the oil above 170 degrees F. and to maintain the temperature above 170 degrees F. and below the oil breakdown temperature of about 300 degrees F. solely by the continuous dissipation of heat from the engine oil system.

4. The method of claim 3 wherein the heat producing element is adhesively bonded to the exterior of an oil pan in the engine oil system.

5. The method of claim 4 wherein the heat producing element has an exterior protective housing that is formed in substantially rectangular shape.

6. The method of claim 5 wherein the oil in the oil system is maintained at a predetermined temperature of 170 degrees F. to 190 degrees F. wherein fluctuations in the outside air temperature around the vehicle substantially exceed the difference between the temperature limits of the predetermined temperature range.

7. An oil system in combination with a thermal balance heater for conducting heat to the oil in the system that requires maintenance of the oil temperature below the oil breakdown temperature and above a predetermined temperature comprising:

an oil container having an exterior surface;

a selected quantity of oil located in said container; a heat producing element for continuously generating heat, said heat producing element located on the exterior surface of said oil container, said heater having a total power output factor, said total power output factor determined by the materials used in the thermal balance heater, said total power output factor being sufficiently high so as to heat the oil in said container to a temperature in excess of 170 degrees F. in about 5 hours, said heat producing element having a total power output factor ranging from about 20 watts per quart of oil to about 40 watts per quart of oil and a power density in excess of 15 watts per square inch, said heat producing element forming a conduction heat transfer path to the oil to be maintained at a temperature below the oil breakdown temperature, said heat producing element being characterized by having no means to maintain the temperature of the oil within predetermined temperature limits other than the thermal heat balance formed between the continuous heat generation by said heat producing element and the continual heat dissipation from the oil system.

8. The thermal balance heater of claim 7 wherein said heating element has a power output of about 30 watts per quart of oil in said oil system.

9. The thermal balance heater of claim 8 wherein said heat producing element includes a protective layer covering said heat producing element with said protective layer comprising a flexible material of silicone and fiberglass having a thickness of about 0.050 inches.

10. The thermal balance heater of claim 7 wherein said thermal balance heater has a substantially rectangular contiguous shape with a projecting profile of of less than 0.250 inches from the exterior of oil container.

11. The thermal balance heater of claim 7 wherein said heat producing element has leads that connect directly to a power cord for continuously supplying electrical current to said heat producing element when said power cord is connected to a house hold power source.

* * * * *